June 2, 1970 R. D. BAXLEY 3,515,120
GROVE HEATER
Filed June 27, 1969
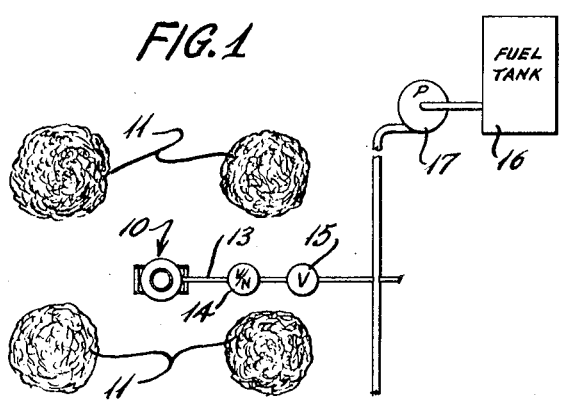
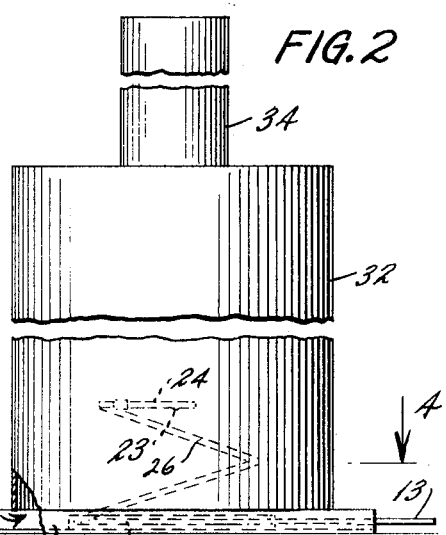
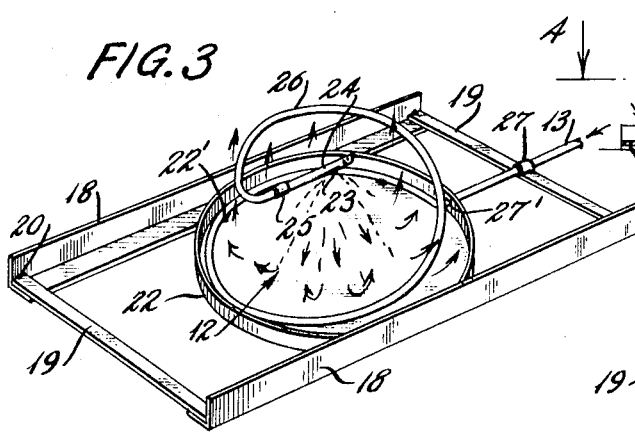
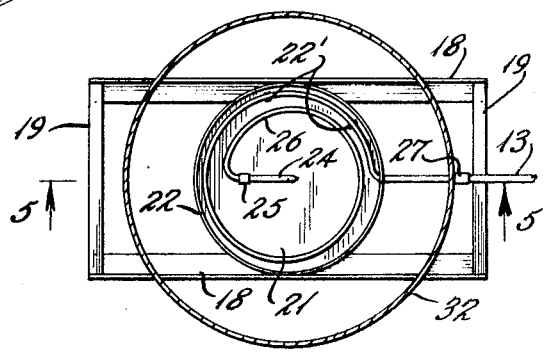
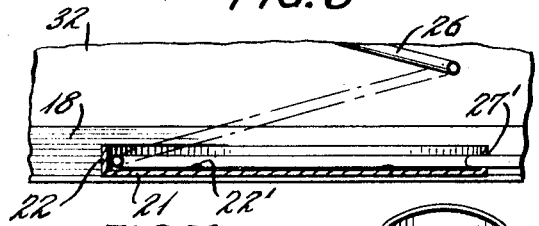
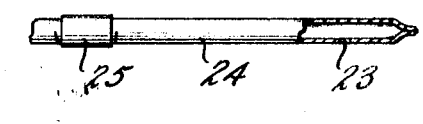
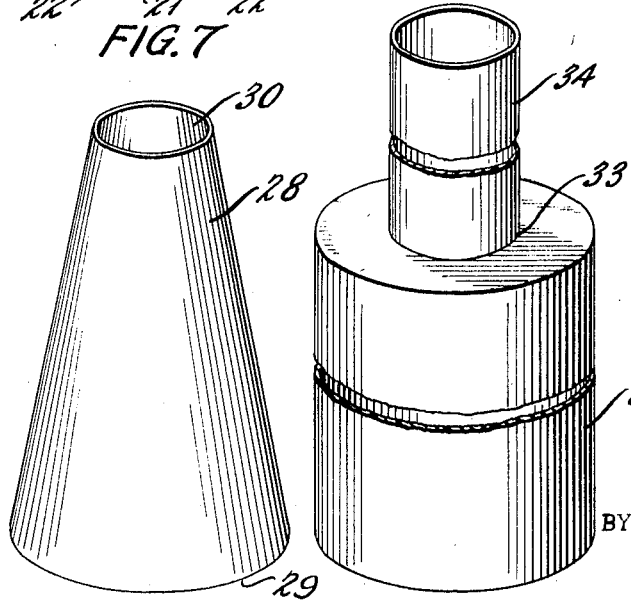
INVENTOR
RALPH D. BAXLEY
BY
ATTORNEYS ന്ദ്ര
United States Patent Office 3,515,120
Patented June 2, 1970

3,515,120
GROVE HEATER
Ralph D. Baxley, P.O. Box 586,
Weirsdale, Fla. 32695
Filed June 27, 1969, Ser. No. 837,073
Int. Cl. A01g *13/06*
U.S. Cl. 126—59.5                    3 Claims

ABSTRACT OF THE DISCLOSURE

A grove heater including a pan mounted in a frame and adapted to rest beneath a combustion chamber forming a shell or container with a fuel line fixed thereto and spirally disposed and terminating in a closed upper end with a bottom opening or orifice through which atomized fuel is projected downwardly and burned for providing the desired heat.

BACKGROUND OF THE INVENTION

Field of the invention

The invention is in the field of heaters, particularly those appropriate for providing a relatively large amount of heat in a grove or orchard to ward off extreme cold or a killing freeze.

Description of the prior art

Heaters of various kinds have been provided for warding off frost, as for example, that disclosed in my Pat. 3,205,885. However, these heaters have been subject to criticism as not being satisfactory from the viewpoint of cost, reliability, efficiency, and for other reasons.

SUMMARY OF THE INVENTION AND OBJECTS

The invention comprises a generally rectangular base or frame in which is mounted a hearth or fire plate with an upstanding rim against which plate vaporized fuel is projected downwardly from a source of liquid fuel under pressure through an orifice from a spiral preheating coil.

It is an object of the invention to provide a simple, inexpensive, practical, reliable, and efficient heater which can be used with fire box forming shells of different sizes and types, and which heater can be readily installed and operated, and with a minimum number of such heaters required for maximum heat.

BRIEF DESCRIPTION OF THE DRAWING

FIG. 1 is a diagrammatic layout illustrating one use of the invention;

FIG. 2, a side elevation of the heater;

FIG. 3, a perspective of the base and preheating coil;

FIG. 4, a reduced horizontal section on the line 4—4 of FIG. 2;

FIG. 5, an enlarged fragmentary view illustrating the burner orifice, a portion of the preheating coil, and the burner pan;

FIG. 6, an enlarged fragmentary detail illustrating the burner orifice; and

FIGS. 7 and 8, burner shells on a reduced scale of two types which can be used to form the fire box.

DESCRIPTION OF THE PREFERRED EMBODIMENT

With further reference to the drawing, in FIG. 1 is illustrated a heater 10 disposed centrally between trees 11 for supplying heat throughout the area in which the trees are located. The heater is supplied with fuel 12 (FIG. 3) through a pipeline 13, provided with a needle valve 14 and a shut-off valve 15, from a fuel tank 16 under the influence of a pump 17. The heater includes a base in the form of a frame of a pair of angle members 18 connected together by bars or straps 19 at each end. The straps 19 are fixed to the angle members 18 in any desired manner, as for example 20 by welding, or with bolts so that the frame can be transported and stored in knockdown condition.

Centrally on the frame is mounted a heat reflecting pan 21 having an upturned marginal flange 22. This pan is adapted to have fuel atomized downwardly against the same from an orifice 23 in the bottom of a replaceable end piece 24 connnected by a coupling 25 and an adjacent portion welded to the end of a spiral preheating coil 26. The lower end of the coil 26 has one end connected by a coupling 27 with the supply line 13.

The coil 26 is employed to facilitate preparing or conditioning fuel for maximum combustion and maximum heat output regardless of whether it is in metal to metal contact with the fire box or not, as preferred. The coil extends through an opening 27' in the flange 22 and with a weld 22' in the area and consequently hot combustion is engulfed by the hottest part of the combustion area.

Fuel is admitted through the line 13 at a relatively low pressure and is ignited at the orifice 23. Thereafter the pressure is increased and due to the fact that the preheating coil is in the general area of the heat zone, the fuel will be vaporized and discharged in an atomized condition and ignited as it is discharged from the orifice 23.

Any suitable type of fire box forming shell may be provided, as for example a frusto-conical member 28 having a relatively large lower end 29 and a substantially smaller or restricted upper end 30. Oxygen is thus provided to support combustion from the admitted air. Instead of the frusto-conical type of fire box forming shell, a generally cylindrical shell 32 may be provided, obtained from an oil drum or other cylindrical container but preferably with a reduced opening 33 in its upper end with a section of pipe of reduced diameter extending therefrom forming a flue.

It will be understood from the foregoing that a simple, practical, efficient, heater is provided of durable construction, low cost, and of such maximum heating proclivities with air admitted thereto beneath the shell which forms the combustion chamber. Also, the burner is composed of few readily available parts so that it can be readily manufactured in any desired quantities and the number of such burners which normally would be expected to be used is reduced to approximately one-fourth to one-half the quantity ordinarily used.

The present heater operates at substantially no pressure when starting and thereafter on very low pressure of from 2 to 30 pounds, while those of competitors in permanent underground systems are using high pressure from 70 to 200 pounds.

The shell forming the fire box rests on the spaced angle members 18 with air passing over the bar 19 underneath the fire box forming shell 32, as illustrated by the arrows in FIG. 4.

What is claimed is:
1. A grove heater of the character described comprising a base including a shallow combustion and heat reflecting pan, a fuel supply line having a portion extending in a gradual coil upwardly from said pan and termi- nating in a closed end portion with an orifice in its bottom portion through which vaporized fuel is adapted to be discharged directly downward and burned in a relatively large combustion and heating area in which the portion of the fuel line which extends in a gradual coil upwardly is exposed and with heat reflected upwardly by the pan in a manner to provide maximum preheating and vaporization of fuel prior to its discharge through said orifice, and a chamber-forming annular wall about said combustion area and having a restricted top discharge, serving to confine and intensify combustion within the combustion and heating area of said chamber.

2. A heater as set forth in claim 1 in which the base includes opposed angle members and connecting members and said pan and fuel supply coil are attached thereto.

3. A heater as set forth in claim 1 in which said chamber-forming annular wall is formed of a conventional drum.

References Cited

UNITED STATES PATENTS

| | | | |
|---|---|---|---|
| 1,116,789 | 11/1914 | Bothwell | 431—242 X |
| 2,260,548 | 10/1941 | Veghte | 126—59.5 X |
| 3,421,494 | 1/1969 | Perkins | 126—59.5 |

OTHER REFERENCES

Meyer, German application No. 1,151,403, pub. July 11, 1963.

CHARLES J. MYHRE, Primary Examiner

U.S. Cl. X.R.

431—242